United States Patent
Powell et al.

[11] Patent Number: 5,649,489
[45] Date of Patent: *Jul. 22, 1997

[54] ELECTROMAGNETIC INDUCTION GROUND VEHICLE LEVITATION GUIDEWAY

[76] Inventors: James R. Powell, P.O. Box 547, Shoreham, N.Y. 11786; Gordon T. Danby, P.O. Box 12, Wading River, N.Y. 11792; John Morena, 4540 Sandpebble Trace #104, Stuart, Fla. 34996

[*] Notice: The term of this patent shall not extend beyond the expiration date of Pat. No. 5,511,488.

[21] Appl. No.: 598,791

[22] Filed: Feb. 9, 1996

Related U.S. Application Data

[63] Continuation of Ser. No. 232,940, Apr. 25, 1994, Pat. No. 5,511,488.
[51] Int. Cl.$^6$ .................................................. B60L 13/10
[52] U.S. Cl. ......................... 104/282; 104/284; 104/285; 104/286; 104/290; 104/124; 246/121
[58] Field of Search .......................... 104/281, 282, 104/283, 284, 285, 286, 287, 290, 292, 124, 125; 246/121

[56] References Cited

U.S. PATENT DOCUMENTS

| | | |
|---|---|---|
| 3,470,828 | 10/1969 | Powell et al. . |
| 3,783,794 | 1/1974 | Gopfert et al. . |
| 3,820,471 | 6/1974 | Maki et al. ........................... 104/282 |
| 3,834,318 | 9/1974 | Fellows et al. . |
| 3,845,720 | 11/1974 | Bohn et al. . |
| 3,933,099 | 1/1976 | Sieb ........................................ 246/5 |
| 4,123,976 | 11/1978 | Nakamura et al. . |

(List continued on next page.)

FOREIGN PATENT DOCUMENTS

| | | | |
|---|---|---|---|
| 3914093 | 10/1990 | Germany . | |
| 4313846 | 11/1993 | Germany . | |
| 11420 | 2/1978 | Japan | 104/284 |
| 17208 | 2/1979 | Japan | 104/290 |
| 151204 | 11/1979 | Japan | 104/290 |
| 107603 | 4/1989 | Japan | 104/282 |
| 37070 | 2/1990 | Japan | 246/121 |

OTHER PUBLICATIONS

"Magnetic Levitation", Rossing et al, The Physics Teacher Dec. 1991.

*Primary Examiner*—S. Joseph Morano
*Attorney, Agent, or Firm*—Fulwider Patton Lee & Utecht, LLP

[57] ABSTRACT

The electromagnetic induction ground vehicle levitation guideway includes a beam support member, and a transverse structural slab member mounted on top of the beam support member. The structural slab member includes top and bottom structural plates mounted to the top and bottom surface of the structural slab member. The guideway includes vertical lift, lateral stability, and linear synchronous motor coils with a null flux geometry in the guideway that interact with superconducting magnets of the vehicle, allowing the vehicle to safely reach speeds of up to 350 mph with relatively low power consumption. A kinetic energy absorption structure is provided on the guideway that is capable of high speed mechanical braking of the vehicle if the superconducting magnets of the vehicle fail. A sloped top protective cover over the energy absorption means is provided to minimize adhesion and buildup of snow and ice, and extends over the sides of the guideway. Sensors are also mounted to the guideway for detecting the presence of heavy objects contacting the guideway, and for determining the location and speed of the vehicle.

22 Claims, 13 Drawing Sheets

U.S. PATENT DOCUMENTS

| | | | |
|---|---|---|---|
| 4,148,260 | 4/1979 | Minovitch | 104/283 |
| 4,259,908 | 4/1981 | Feistkorn et al. . | |
| 4,280,412 | 7/1981 | Mihirogi . | |
| 4,516,505 | 5/1985 | Heidelberg . | |
| 4,641,586 | 2/1987 | Miller et al. . | |
| 4,646,651 | 3/1987 | Yamamura et al. . | |
| 4,665,830 | 5/1987 | Anderson et al. | 104/124 |
| 4,731,569 | 3/1988 | Bohn . | |
| 4,860,510 | 8/1989 | Kotler | 52/177 |
| 4,866,380 | 9/1989 | Meins et al. . | |
| 4,913,059 | 4/1990 | Fuji et al. | 104/282 |
| 4,972,779 | 11/1990 | Morishita et al. . | |
| 5,027,713 | 7/1991 | Kindmann et al. | 104/124 |
| 5,049,001 | 9/1991 | Dinitz | 404/7 |
| 5,052,309 | 10/1991 | Haselwander et al. | 104/125 |
| 5,067,415 | 11/1991 | Morishita et al. . | |
| 5,094,173 | 3/1992 | Tada et al. . | |
| 5,146,853 | 9/1992 | Suppes . | |
| 5,178,072 | 1/1993 | Suzuki . | |
| 5,184,557 | 2/1993 | Rossing . | |
| 5,511,488 | 4/1996 | Powell et al. | 104/284 |

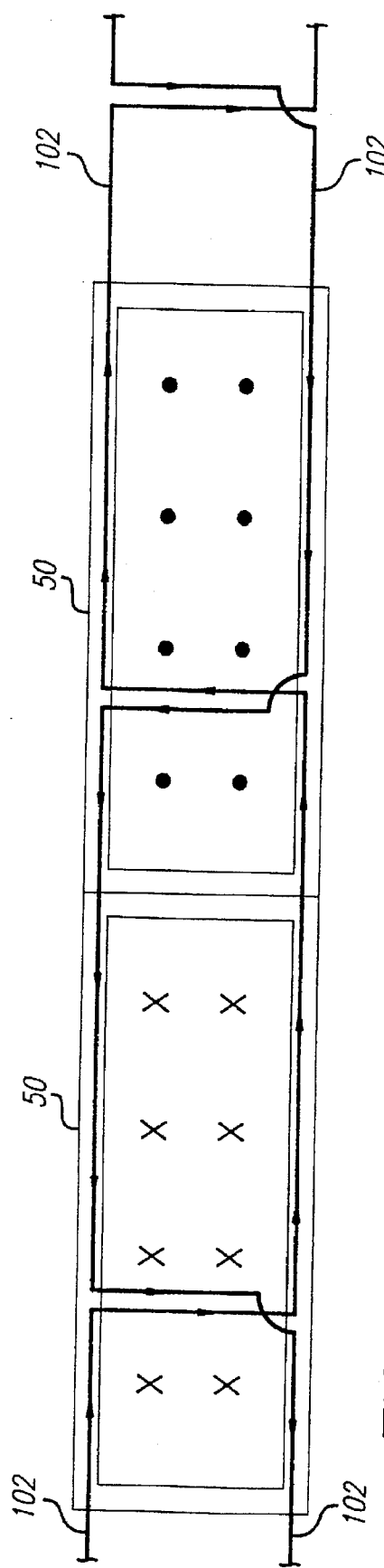
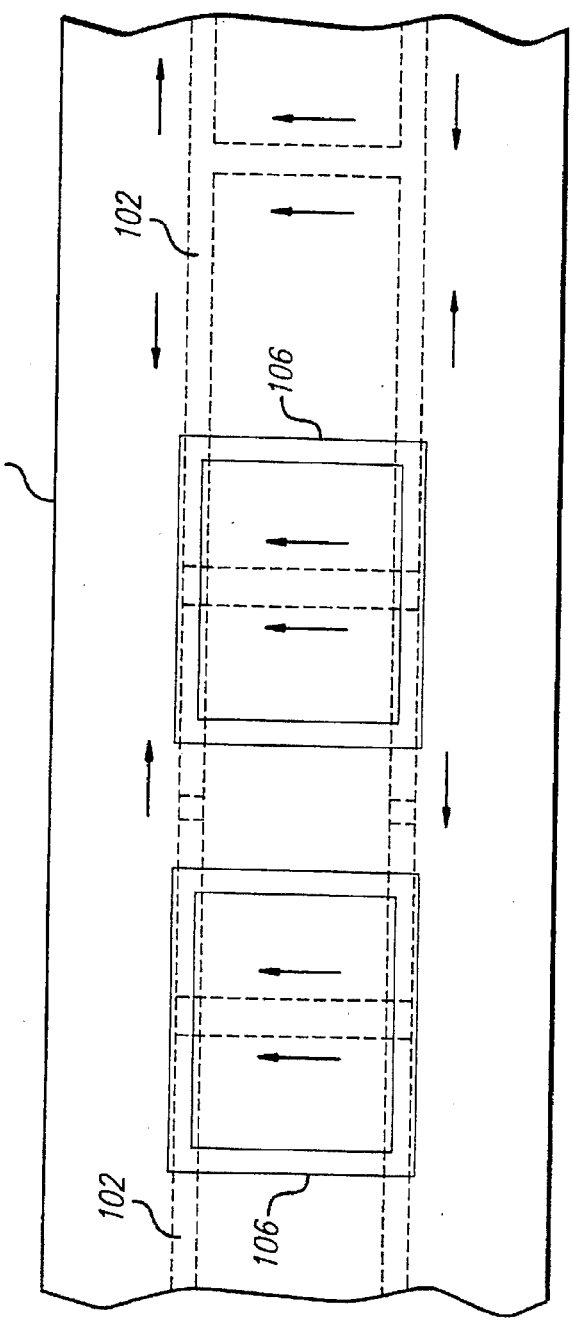
FIG. 8
FIG. 9

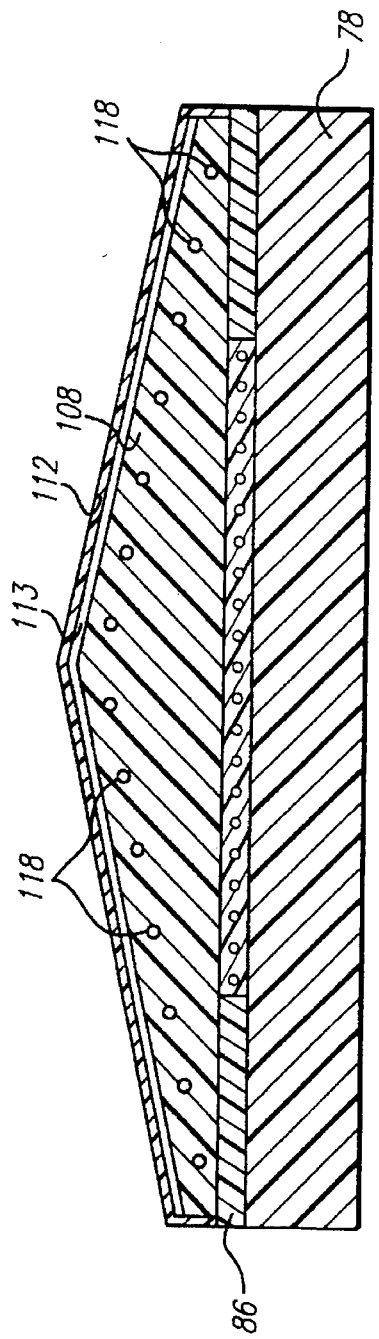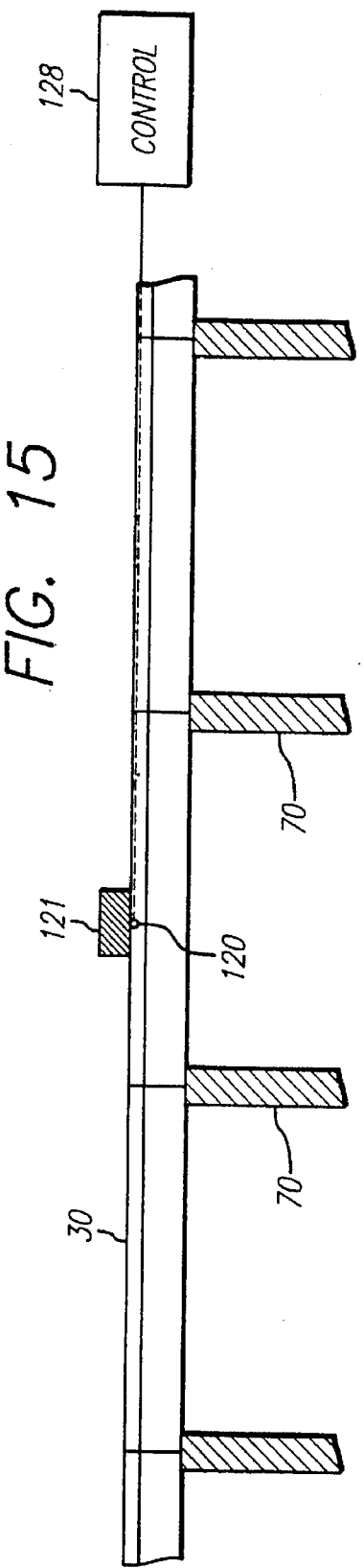

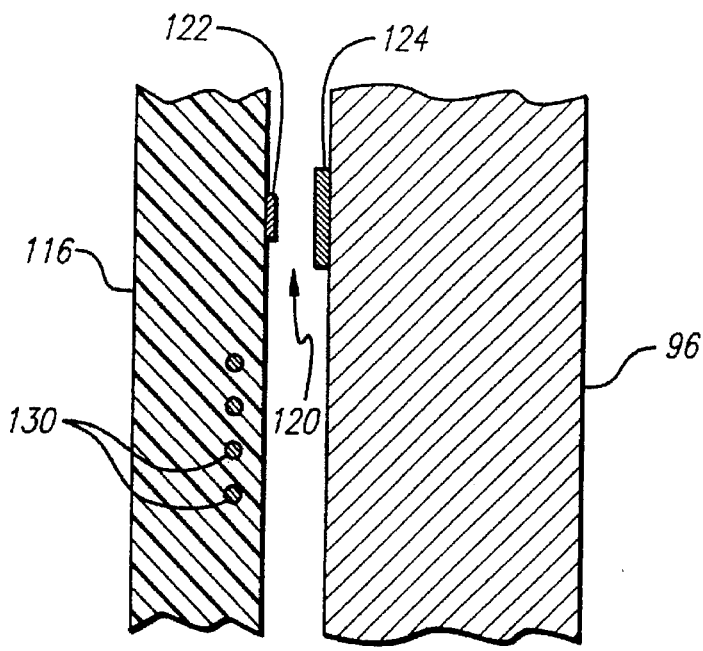
FIG. 16
FIG. 17
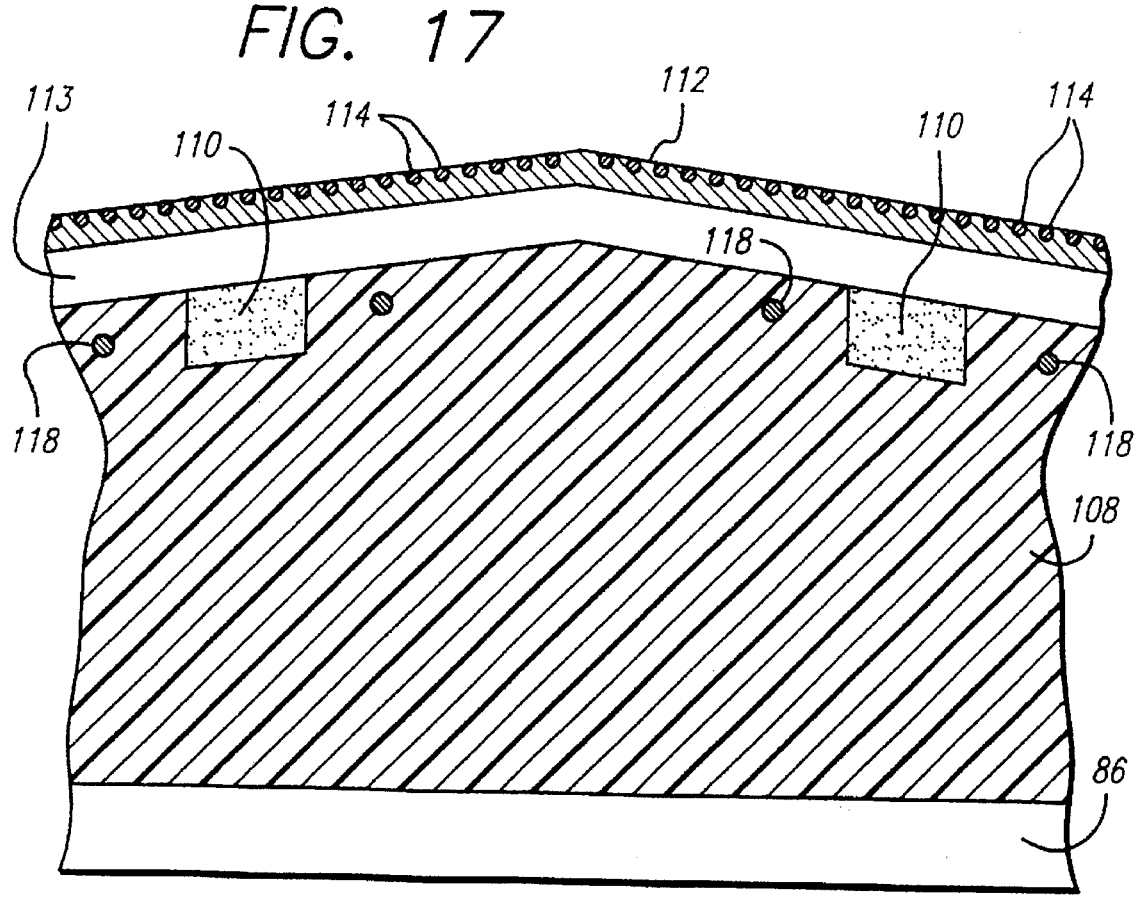

ELECTROMAGNETIC INDUCTION GROUND VEHICLE LEVITATION GUIDEWAY

This is a continuation of application Ser. No 08/232,940, filed Apr. 25, 1994, now U.S. Pat. No. 5,511,488.

BACKGROUND OF THE INVENTION

1. Field of the Invention

This invention relates generally to a guideway and levitation system for transport vehicles, and more particularly concerns an electromagnetic induction and levitation system for a high speed transport vehicle utilizing the interaction between superconducting magnets on the vehicle and an ensemble of normal metal loops and windings on a fixed guideway that is constructed along the ground.

2. Description of Related Art

With an increasing need for transportation systems that can minimize environmental and noise pollution, that are more energy efficient, and that can reduce the traffic congestion and improve travel safety, and with new advances in materials and technology, interest in passenger and freight ground vehicles levitated by magnetic forces has also grown. Such systems have been proven in pilot projects to be able to achieve speeds of 300 miles per hour and faster. At such high speeds, conventional wheeled vehicles become highly inefficient and impractical.

Vehicles that are levitated magnetically without contacting a support surface encounter reduced friction and vibration problems due to roadbed irregularities. Passenger and freight transport systems utilizing normal permanent magnets or electromagnets have utilized magnetic attraction or repulsion, with the carrier and track held at a set distance through feedback from a gap sensor. One such system, for example, provided for a row of vertical support magnets and another row of lateral guide magnets. In the event of failure of the magnetic levitation, some systems have also provided emergency gliding or set-down skids for a controlled crash. Normal motive systems, as well as linear induction motors have also been utilized with such systems for propulsion. However, normal magnetic levitation systems are typically massive, consume large amounts of energy to control, suspend, and propel the vehicle, and are constrained to have a small clearance, typically less than one inch between the suspended vehicle and the guideway.

Lighter, more energy efficient electromagnetic inductive levitation and stabilization systems that enable large clearances, typically several inches, have also been proposed for a ground vehicle, utilizing superconducting magnets carried by the vehicle. An early system provided for a train levitation system based on the magnetic repulsion generated between two superconducting loops carrying D.C. current, one on a moving train and one on a stationary track. In a subsequent system, the superconducting magnets interacted with a plurality of arrays of longitudinally extending shorted loops of a non-magnetic metal conductor, such as aluminum, in a guideway. The vehicle was suspended over the guideway by magnetic interaction of the superconducting magnets with the shorted loops in the guideway. The vehicle was supported on wheels when at rest, or when it was started, or operated at transitional speeds below that necessary to suspend the vehicle. Vertical lift was provided by magnetic interaction of the superconducting magnets with coils in the form of individual shorted loops. Horizontal stability was provided by magnetic interaction of the superconducting magnets with coils arranged in a figure 8 shape or in the form of a longitudinally extending series of two vertically spaced, electrically separated loops. The superconducting magnets were accommodated in a coolant container of a car of the train, and auxiliary and emergency support devices, such as wheels and a fixed skid, were provided support in the event that the levitation of the train was terminated in use, such as if the superconducting magnets became normal. The train was propelled by a linear synchronous motor, in which thrust was obtained by providing AC current to propulsion windings on the ground, which magnetically interacted with, and pushed forward the superconducting magnets located on the car of the train.

However, the guideways previously proposed for magnetically levitated vehicles are typically subject to accumulation of hazardous foreign material or objects, such as snow, ice, or other small, loose objects that can fall on or near the track. It would be desirable to provide for an electromagnetic induction levitation guideway that can readily shed such hazardous foreign material, and detect heavy foreign objects on or otherwise contacting the guideway. It would also be desirable to provide such a system for detecting not only foreign objects, but also for determining the location and speed of the vehicle travelling along such a guideway.

In addition, the guideways previously proposed for magnetically levitated vehicles do not readily permit controlled high speed mechanical braking in the event that the superconducting magnets were to fail. It would be desirable to provide such a guideway that incorporates a kinetic energy absorption system for maintaining the vehicle on the guideway and controlling a high speed emergency braking of the vehicle in the rare event of failure of the magnetic levitation of the vehicle.

Moreover, previously proposed magnetic levitation guideways have not been designed as lightweight prefabricated structures that can be mass produced in a factory, shipped by conventional methods such as by truck or rail, and erected in the field with minimum labor to produce the finished ready-to-operate system. Such a guideway would be highly desirable, because of the lower costs associated with factory mass production, and the faster, less disruptive erection of the guideway in the field.

Another deficiency of previously published magnetic levitation system designs has been their inability to change to different guideway configurations using the same magnetic arrangement on the vehicle. This ability would allow the use of a low cost guideway for the bulk of a maglev route, with a shift to a different guideway configuration when high speed switching or other special situations become necessary. The present invention can shift between a wide range of beam, channel, and planar guideway configurations without changing the magnet arrangement on the vehicle.

A further deficiency of previously published guideway designs is their lack of smooth, non-bumpy surfaces. This results in increased aerodynamic drag and noise when the air displaced by the high speed vehicle interacts aerodynamically and acoustically with the non-smooth surface. The shape and surface of the guideway in the present invention is designed to be free of periodic irregularities and structure so that the displaced air currents always interact with a constantly uniform smooth surface that generates a minimum of air drag and noise.

It would also be desirable for a guideway for a vehicle levitated by superconducting magnets to be configured to allow the electromagnetic induction levitation system and the linear synchronous motor windings to consume a relatively low amount of energy, particularly compared to other conventional forms of transportation.

The present invention meets the needs described above.

SUMMARY OF THE INVENTION

Briefly, and in general terms, the present invention provides for an electromagnetic induction guideway that accommodates vehicles using superconducting magnets for levitation, and that provides inherent vertical and lateral stability, including pitch, yaw and roll stability. The guideway is configured to readily shed ice and snow and loose objects, and includes sensors for detecting hazardous objects on or near the guideway, as well as for determining the location and speed of the vehicle on the guideway. A kinetic energy absorption structure is provided on the guideway that is capable of high speed mechanical braking of the vehicle if the superconducting magnets fail. The superconducting magnets on the vehicle induce ground track current in an arrangement of vertical lift, lateral stability, and linear synchronous motor (LSM) coils with a null flux geometry in the guideway that allows the vehicle to safely reach speeds of up to 350 mph with relatively low power consumption. The guideway incurs very low wear and requires a minimum of maintenance, because the levitation system is free of contact with the high speed vehicle. The guideway has a small "foot print" that helps preserve the environment, and can be installed along existing rights of way at a low construction cost. The guideway can be formed of lightweight pre-fabricated structures that can be mass produced in a factory, with all structural and electrical elements attached, and transported to the field to be readily assembled to produce the finished ready-to-operate system.

The unique configuration of electromagnetic elements located both on the vehicle and in the guideway of the present invention, which interact to produce very efficient levitation and propulsion of the vehicle, also permits the uniquely simple, lightweight, and low cost guideway construction of the present invention. High efficiency of lift, restoring forces and propulsion results from the magnet design, the guideway electrical loop design, and the ferromagnetic lift enhancement. Reduced power dissipation in the guideway translates into lower materials needs and lower cost of the guideway electrical elements. The guideway requires a simple, narrow, lightweight central support beam. Large clearances both horizontally and vertically are permitted between the vehicle and the guideway, both of which can have continuous aerodynamically smooth surfaces for reduced drag and noise.

Accordingly, the present invention provides for an electromagnetic induction levitation guideway for a vehicle having superconducting magnets for providing magnetic levitation of the vehicle and adapted to travel in a longitudinal direction along the guideway. The guideway includes a beam support member for supporting the weight of vehicle, a transverse structural slab member formed of non-metallic material mounted on top of the beam support member, and means for mounting the structural slab member to the support beam member. The means for mounting the structural slab member preferably comprises a rigid bottom structural plate mounted to the bottom surface of the structural slab member, and is preferably formed of a composite of small diameter insulated steel wire and a plastic laminate or polymer concrete, or the like. The steel wire in the bottom plate helps to shield the vehicle from the superconducting magnets on the vehicle. The bottom plate can also include ferromagnetic lift inserts, such as ferromagnetic plates, sheets, stranded wire, or powder mechanically anchored on or within the bottom structural plate, for providing lift to the vehicle by magnetic attractive interaction with the superconducting magnets of the vehicle steel.

Mounting plates formed of a composite material are mounted to the bottom plate of the structural slab member and the support beam on opposing sides of the support beam, and may include metallic fibers incorporated to enhance thermal conductivity of the mounting plates, and a plurality of openings to allow for convective cooling of the guideway.

Vertical lift means for providing vertical lift and stability are provided by the guideway, and preferably comprise first and second pairs of passive magnetic induction coils mounted on first and second sides of the guideway, respectively. The vertical lift magnetic induction coils are advantageously arranged in a planar null-flux geometry, such that when the superconducting magnets are in proximity to the pair of passive magnetic induction coils and are not centered vertically on the first and second pairs of passive magnetic induction coils on each side of the guideway, a vertical restoring force proportional to the displacement of the superconducting magnets from the center of the coils forces the superconducting magnets of the vehicle back to the same height as the center of the coils. The vertical lift magnetic induction coils are mounted to the mounting plates on each side of the guideway, and in one aspect of the invention, are arranged in a figure 8 null flux geometry.

Magnetic induction drive means are also provided for propelling the vehicle along the guideway, preferably comprising a source of alternating current, and a plurality of pairs of power coils disposed on opposing sides of the guideway connected to the source of alternating current. The plurality of pairs of power coils are also mounted to the mounting plates. The pairs of power coils are arranged to alternate in polarity along the guideway, so that the current flow creates a magnetic field in a first direction for a first power coil, and in a second direction opposite to the first direction for a second power coil adjacent to the first power coil, to interact with the vehicle superconducting magnets to provide thrust to the vehicle at synchronous speed. The superconducting magnets of the vehicle are arranged in a plurality of pairs with a fixed pitch, and the plurality of pairs of power coils are correspondingly arranged so as to have a pitch that is the same as the pitch of the superconducting magnets. Means for controlling the frequency of the alternating current can also be provided for controlling the speed of the vehicle.

Lateral stability means are also provided for laterally stabilizing and centering the vehicle with respect to the guideway. The later stability means preferably comprise first and second passive magnetic induction lateral stability coils mounted on first and second sides of the guideway, respectively. The lateral stability coils are also mounted to the mounting plates. The lateral stability coils are preferably arranged such that when the superconducting magnets are in proximity to the lateral stability coils and are not spaced laterally equidistant from the first and second lateral stability coils on each side of the guideway, a lateral restoring force of the superconducting magnets forces the superconducting magnets of the vehicle to be equidistant from the first and second lateral stability coils. The first and second lateral stability coils are preferably cross-connected in a null flux arrangement in pairs located immediately opposite each other, on either side of the guideway. Alternatively, first and second pairs of spaced apart lateral stability coils can be connected in series in a lateral null flux arrangement so as to give no net induction when the vehicle is centered laterally with respect to the guideway. The lateral stability coils are preferably laterally centered on the figure 8 lift loop and the power coils, such that no current is induced in one coil by any other adjacent coil.

In the guideway configuration according to the principles of the invention, the sets of superconducting magnets on the vehicle produce currents in the array of metal loops on the narrow beam that is located between the vehicle superconducting magnets. As described above, the induced currents in the guideway loops magnetically interact with the superconducting magnets on the vehicle to levitate it and automatically stabilize it in the vertical, lateral, pitch, yaw and roll directions.

The superconducting magnets are placed on the vehicle so that the guideway configuration can be altered to a different configuration whenever desired, without shifting the position of the vehicle magnets or altering their currents. The narrow beam guideway according to the principles of the invention, for example, can be altered to a flat planar guideway or to a trough shaped guideway without changing the vehicle magnets, with a subsequent return to the narrow beam guideway when desired. The change to a planar guideway, which is described in a separate patent application, enables the vehicle to electrically switch at high speed to a secondary guideway without mechanical motion of the guideway structure or electromagnetic induction loops.

The placement of vehicle magnets and guideway loops to enable altering the guideway configuration whenever desired is an integral part of the invention described in this application. Separate applications describe the alternate guideway configurations that can be interchanged with the narrow beam guideway that is described in this application.

Various superconducting magnet geometries can be used for the vehicle superconducting magnets that will enable changes in guideway configuration, including dipoles, quadrupoles, sextupoles, and magnet windings of higher multipolarity. The quadrupole magnet configuration of this invention achieves much lower fringing fields than dipoles, is simple to construct, and enables a smooth dynamic transition between different guideway configurations. It should be understood, however, that the invention is not limited to the case of quadrupoles, and that in fact other multipole magnet geometries could be used that meet the criteria of acceptable fringe fields, simplicity of construction, and smooth dynamic transition between alternate guideway configurations.

The outside surface of the guideway is smoothly contoured with no bumps, projections, holes, or the like, that could increase aerodynamic drag or noise caused by movement of air as it is displaced by the on-coming high speed vehicle. The electromagnetic loops and beam support structure on the guideway are all enclosed inside a smooth plastic cover that is surface finished to be equivalent to a high quality airplane skin. The high quality finish is achieved through appropriate molding of the plastic cover and/or a surface coating.

The various electromagnetic and structural components of the narrow beam guideway are all capable of being mass produced in an appropriate factory or factories, and then assembled into a finished prefabricated beam, also at an appropriate factory location, which may be co-located or separate from the factory or factories that produce the separate individual components for the beam. After assembly, the lightweight beams, each typically on the order of a lightweight bridge overpass girder in length, would be shipped to the maglev construction site where they would be erected to form the finished guideway. The piers and footings used for the guideway can be formed and erected in the field for supporting the guideway. The guideway is preferably mounted on a plurality of piers anchored to the ground, that are free to expand longitudinally and contract due to temperature changes. The piers preferably include pier caps that can be adjusted in height to match the elevation of adjacent support beam members, and are preferably electrically connected with the support beam members to provide grounding of the guideway against lightning strikes.

In another aspect of the invention, the guideway also includes a top structural plate with a flat upper surface, mounted to the top surface of the structural slab member. The top structural plate includes a centrally located ferromagnetic portion and non-ferromagnetic peripheral portions. The central ferromagnetic portion serves to center ferromagnetic skids of the vehicle on the guideway in the event that the superconducting magnets become normal, and magnetic levitation of the vehicle fails.

To provide for high speed emergency braking of the vehicle under such conditions, a breakaway energy absorption means is also mounted to the top structural plate for absorbing kinetic energy of the vehicle. The energy absorption means is preferably made of composite material, such as a polymer matrix with metallic or non-metallic fibers, typically with an egg-crate type construction. The energy absorption means also preferably includes a plurality of sand pockets filled with loose filling or inert small diameter particles such as sand, that can be accelerated by the vehicle as it breaks away the energy absorption means, absorbing kinetic energy.

Alternatively, the particulate matter can be contained, for example, in a foam matrix, for ease of construction. The essential feature of the energy absorbing cap is that under emergency conditions where aerodynamical, frictional, or regenerative electromagnetic braking is not adequate or fails in its function, the vehicle will be rapidly slowed down by transferring its kinetic energy to particulate material This will occur spontaneously with loss of lift by simple mechanical interference. Alternatively, a "cowcatcher" on the front of the vehicle could be lowered in a dire emergency to shred the energy absorbing cap.

A thin, flexible composite layer of fire resistant material forms a sloped top protective cover over the energy absorption means, and is preferable provided to minimize adhesion and buildup of snow and ice, to keep water out of the egg crate structure, and to protect the energy absorption means against degradation by sunlight. The top protective cover is preferablly flexible, so as to flex when a vehicle passes overhead, helping to break up and dislodge snow and ice that may accumulate on top of the guideway. The top protective cover also preferably includes heating wires for melting snow and ice on top of the guideway. The top cover is also preferably grounded to the beam support members and piers for protection of the guideway from lightning. The protective cover also extends over the mounting plates, and is mounted thereto, with an air gap between them to allow convective cooling of the guideway.

Sensor means are also mounted to the guideway for detecting the location of the vehicle and the presence of heavy objects contacting the guideway. The sensor means can include a plurality of sensors embedded in the energy absorption egg crate structure on top of the guideway and under the top protective cover, across the width of the top of the guideway, for detecting the presence of a heavy object on top of or on the side of the guideway that could damage the vehicle. The sensors can also be used to monitor the location of the vehicle, and the speed of the vehicle.

These and other aspects and advantages of the invention will become apparent from the following detailed description, and the accompanying drawings, which illustrate by way of example the features of the invention.

BRIEF DESCRIPTION OF THE DRAWINGS

FIG. 8 is an elevational diagram of the superconducting quadrupole magnets of the vehicle and the windings of the linear synchronous motor drive loops of the guideway;

FIG. 9 is an elevational diagram of the linear synchronous motor drive loops and the lateral stability loops of the guideway;

FIG. 14 is a sectional view of the breakaway energy absorption structure and top protective cover of the guideway;

FIG. 15 is a side elevational view of an object over a weight sensitive sensor of the guideway;

FIG. 16 is an inverted view of the side protective cover and weight sensitive sensors of the guideway;

FIG. 17 is an enlarged, partial sectional view of the breakaway energy absorption structure and top protective cover of the guideway;

DETAILED DESCRIPTION OF THE PREFERRED EMBODIMENTS

Ground transport systems utilizing normal permanent magnets or electromagnets for magnetic levitation of a vehicle have heretofore typically been massive, consuming large amounts of energy to control, suspend, and propel the vehicle, and having only small clearances between the vehicle and guideway, typically less than an inch. Previously proposed systems with superconducting magnets carried by the vehicle for magnetic levitation of the vehicle typically still consume a great deal of power, and have also commonly utilized guideway structures that are subject to accumulation of hazardous foreign material or objects, such as snow, ice, or other small, loose objects that can fall on or near the track. In addition, such guideway structures for magnetically levitated vehicles do not readily permit controlled high speed mechanical braking in the event that the levitation magnets were to fail.

Figure 1:
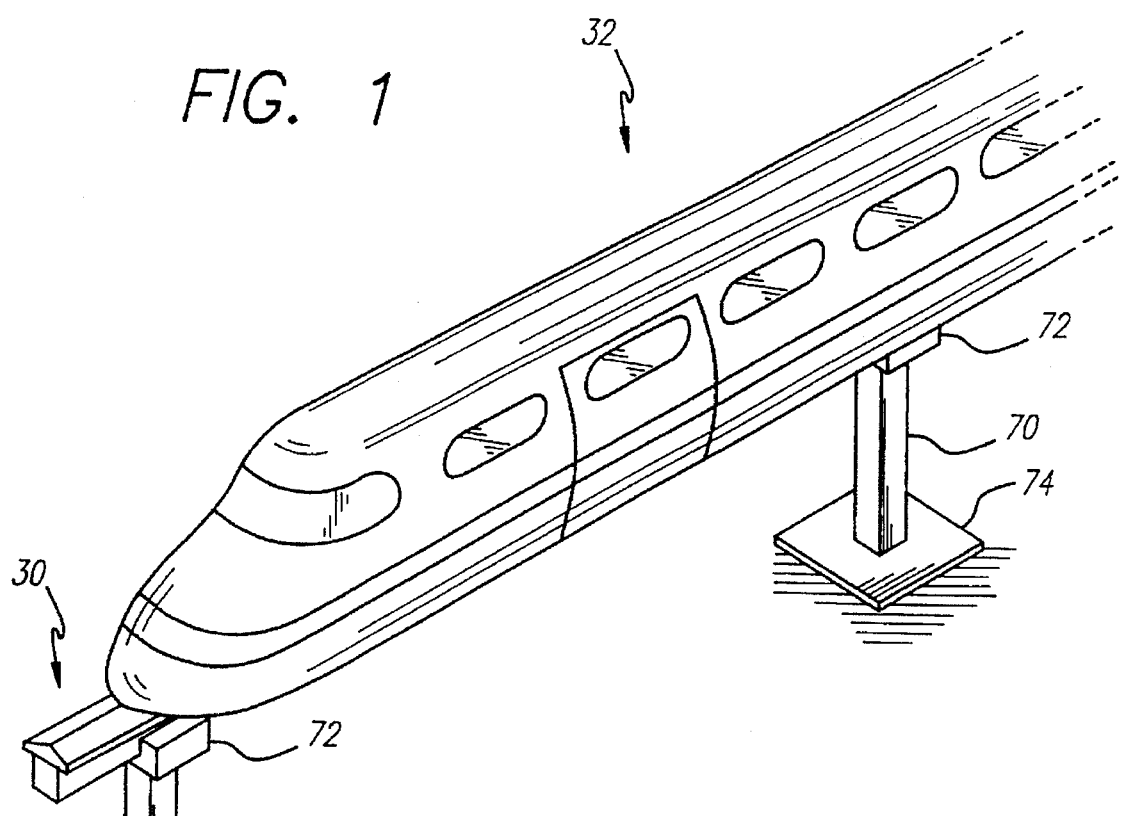
FIG. 1 is a perspective view of a ground vehicle on an electromagnetic induction ground vehicle levitation guideway according to the principles of the invention.
Figure 2:
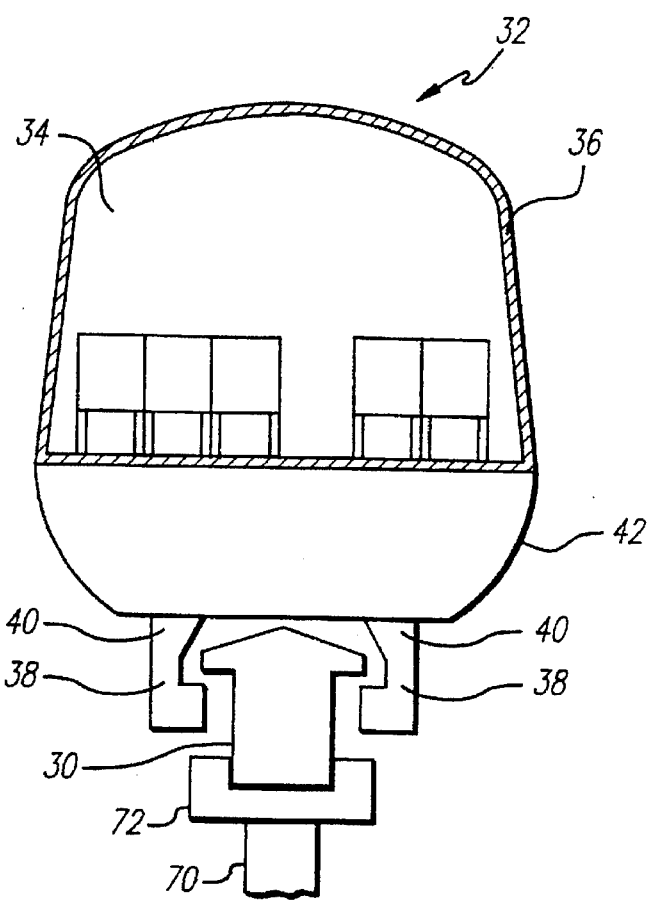
FIG. 2 is an enlarged partial sectional view of the vehicle and guideway of FIG. 1.
Figure 3:
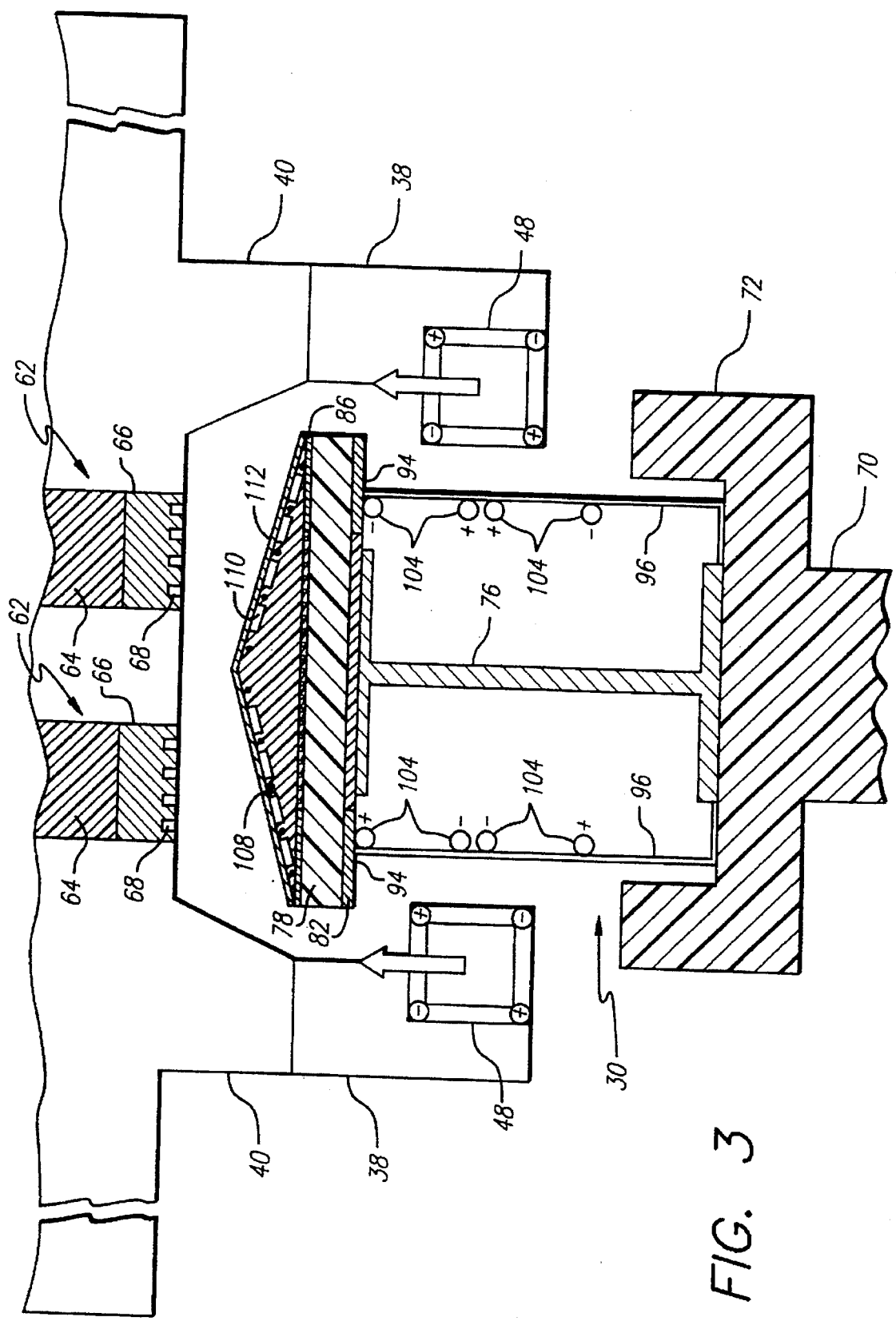
FIG. 3 is a further detailed, enlarged sectional view of the vehicle and guideway of FIG. 1, illustrating the pitch stabilization feature of the guideway.
Figure 4:
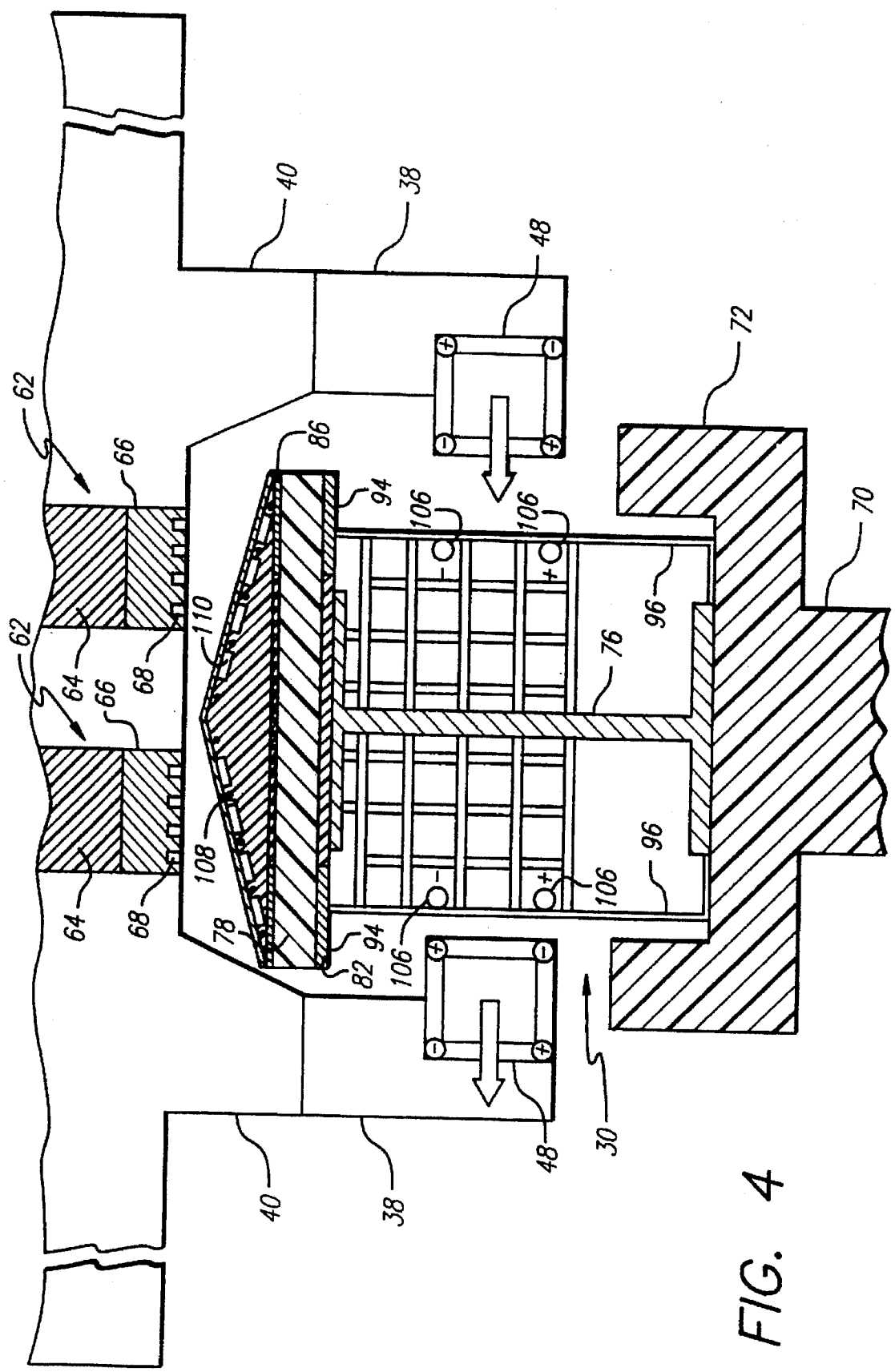
FIG. 4 is a sectional view of the vehicle and guideway similar to that of FIG. 3, illustrating the yaw stabilization feature of the guideway, showing the direction of the forces on the vehicle magnets operating to restore the vehicle to a centered position in the case where the vehicle has been locally displaced to the right with respect to the guideway.
Figure 5:
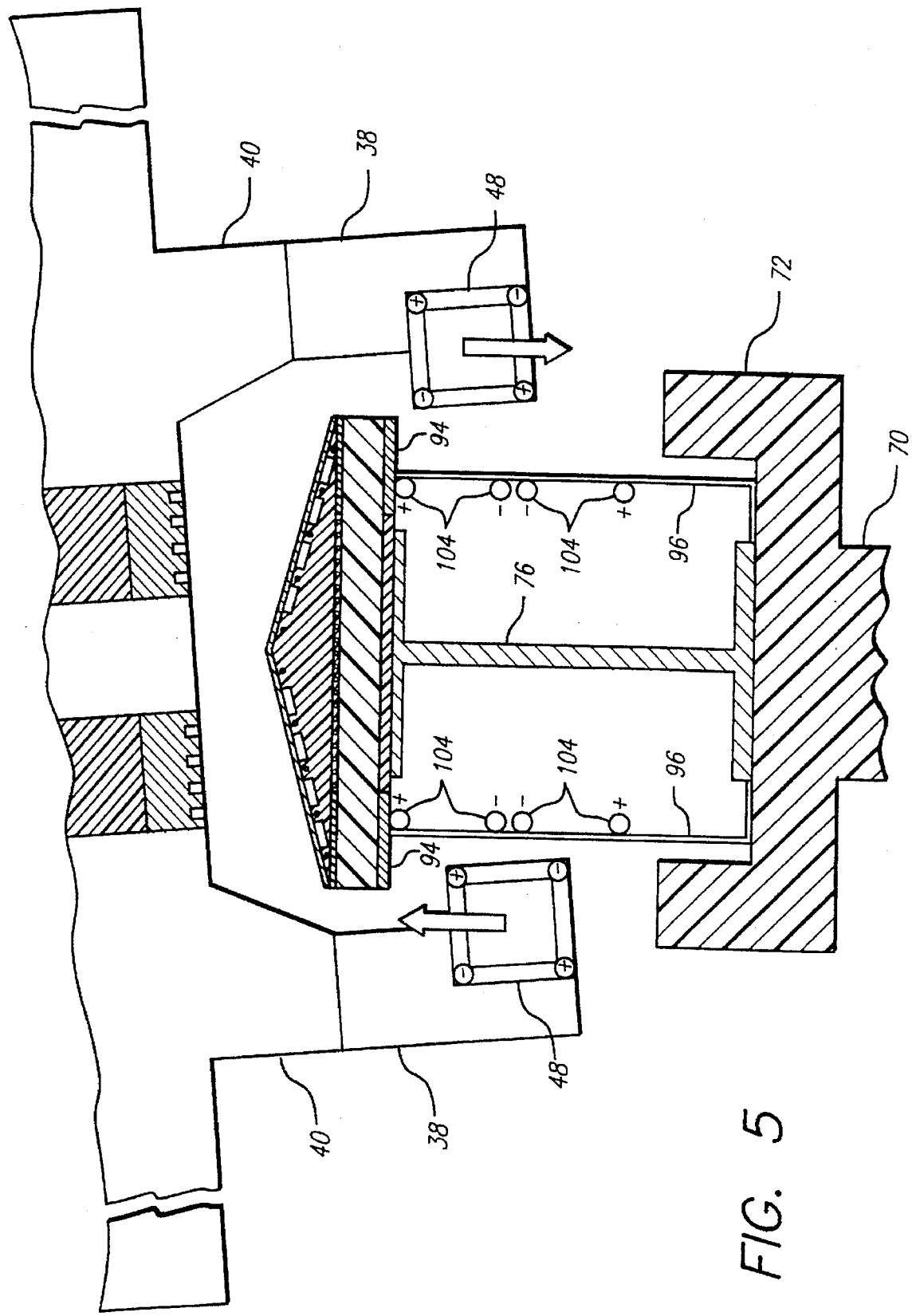
FIG. 5 is a sectional view of the vehicle and guideway similar to that of FIG. 3, illustrating the roll stabilization feature of the guideway.
Figure 6:
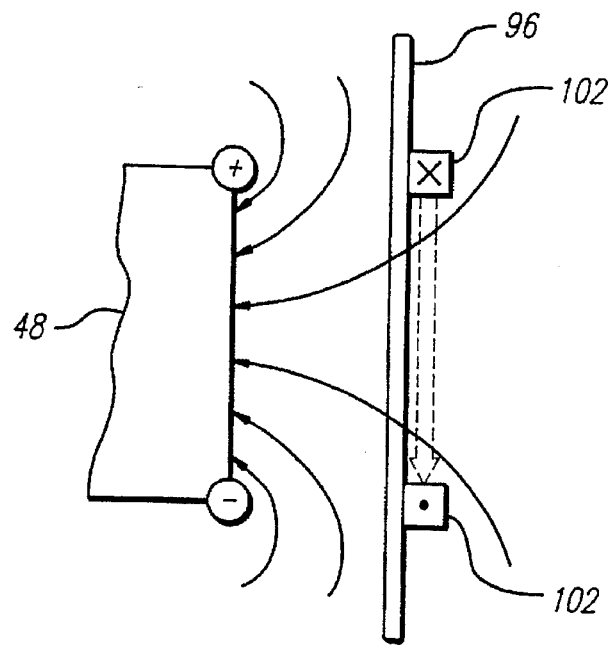
FIG. 6 is a diagram of the magnetic interaction of a superconducting quadrupole magnet of the ground vehicle with a linear synchronous motor drive loop of the guideway.
Figure 7:
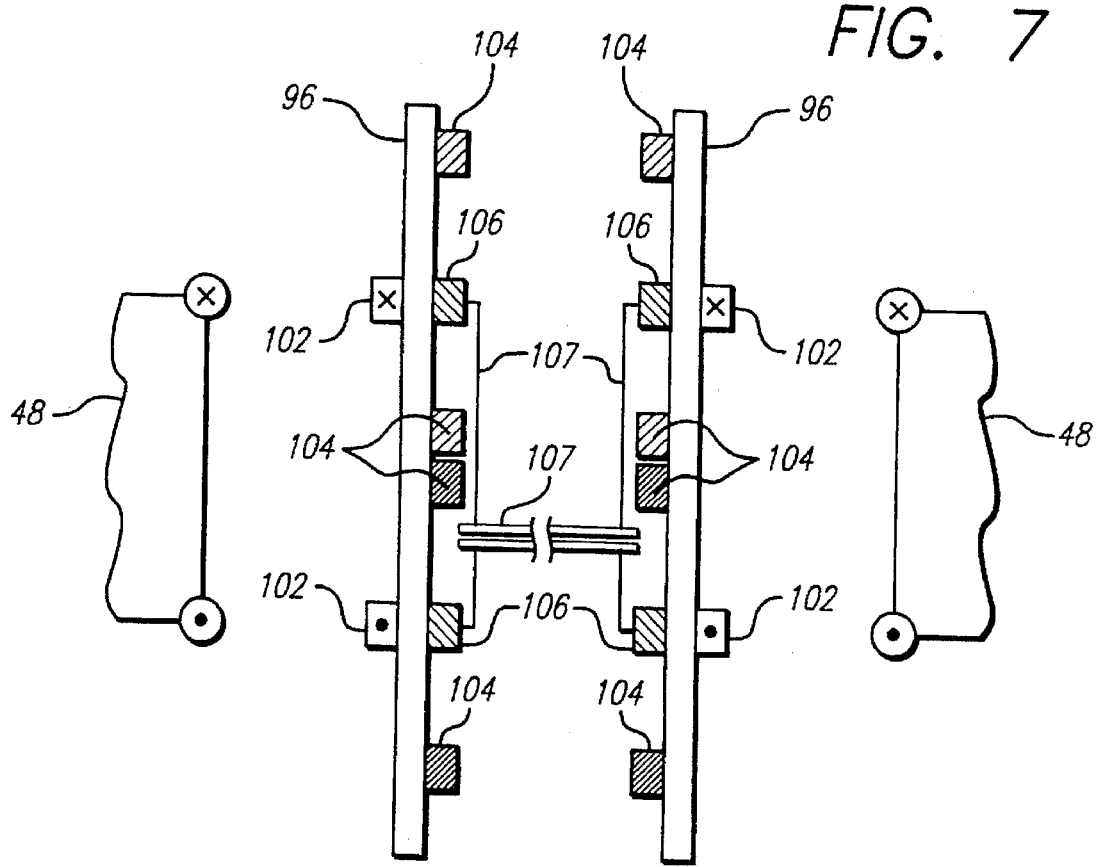
FIG. 7 is a sectional diagram illustrating relative placement of the superconducting quadrupole magnets of the ground vehicle with the linear synchronous motor drive loops, vertical lift and stability loops, and lateral stability loops of the guideway.
Figure 10:
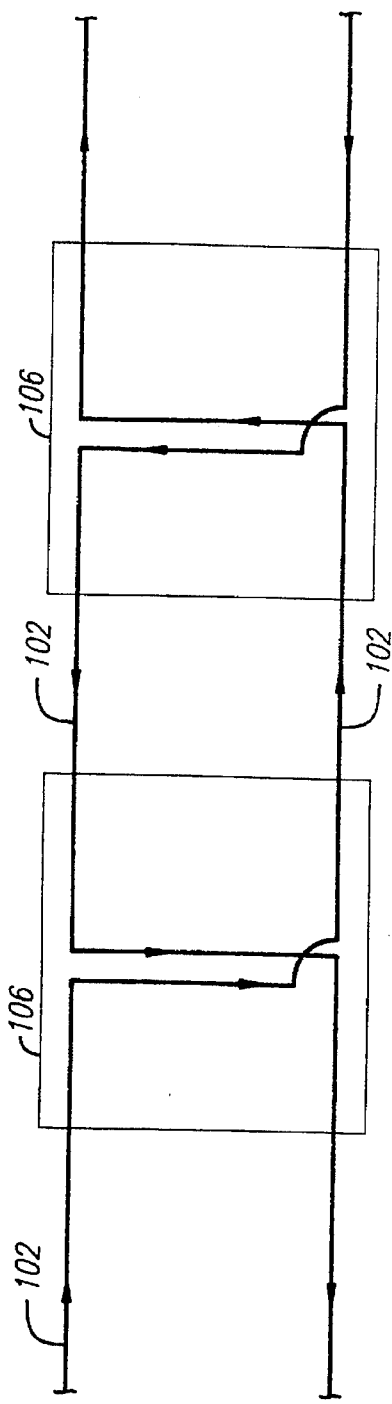
FIG. 10 is another elevational diagram of the linear synchronous motor drive loops and the lateral stability loops of the guideway.
Figure 11:
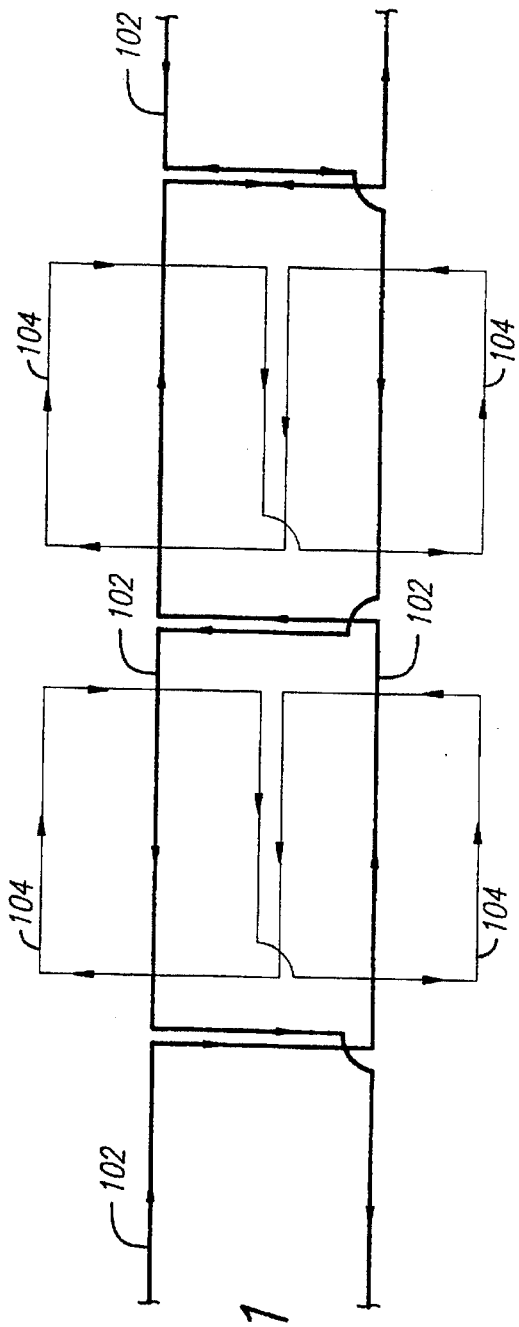
FIG. 11 is an elevational diagram of the linear synchronous motor drive loops and the vertical lift and stability loops of the guideway.
Figure 12:
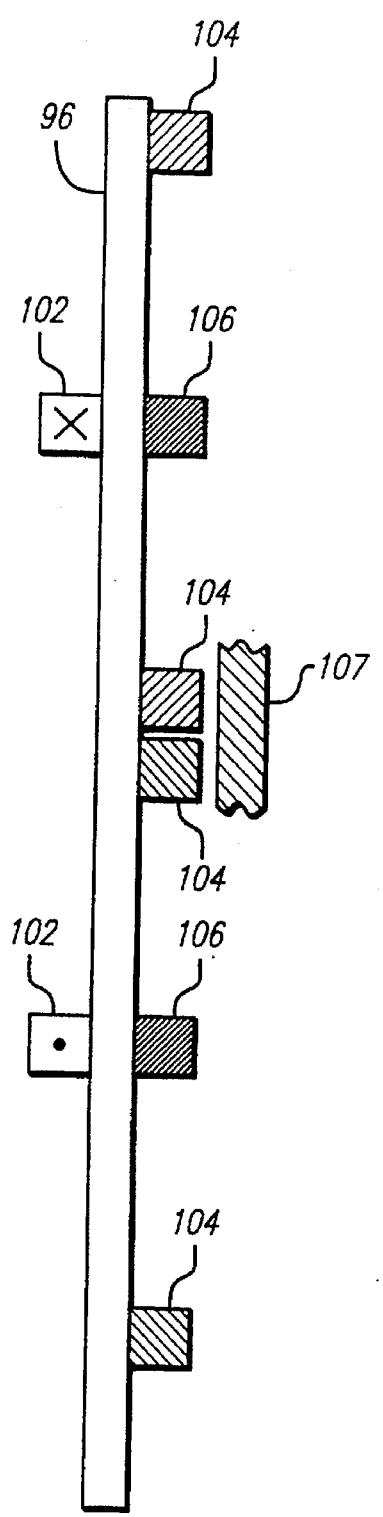
FIG. 12 is an enlarged sectional view of the linear synchronous motor drive loops, vertical lift and stability loops, and lateral stability loops on a mounting plate of the guideway.
Figure 13:
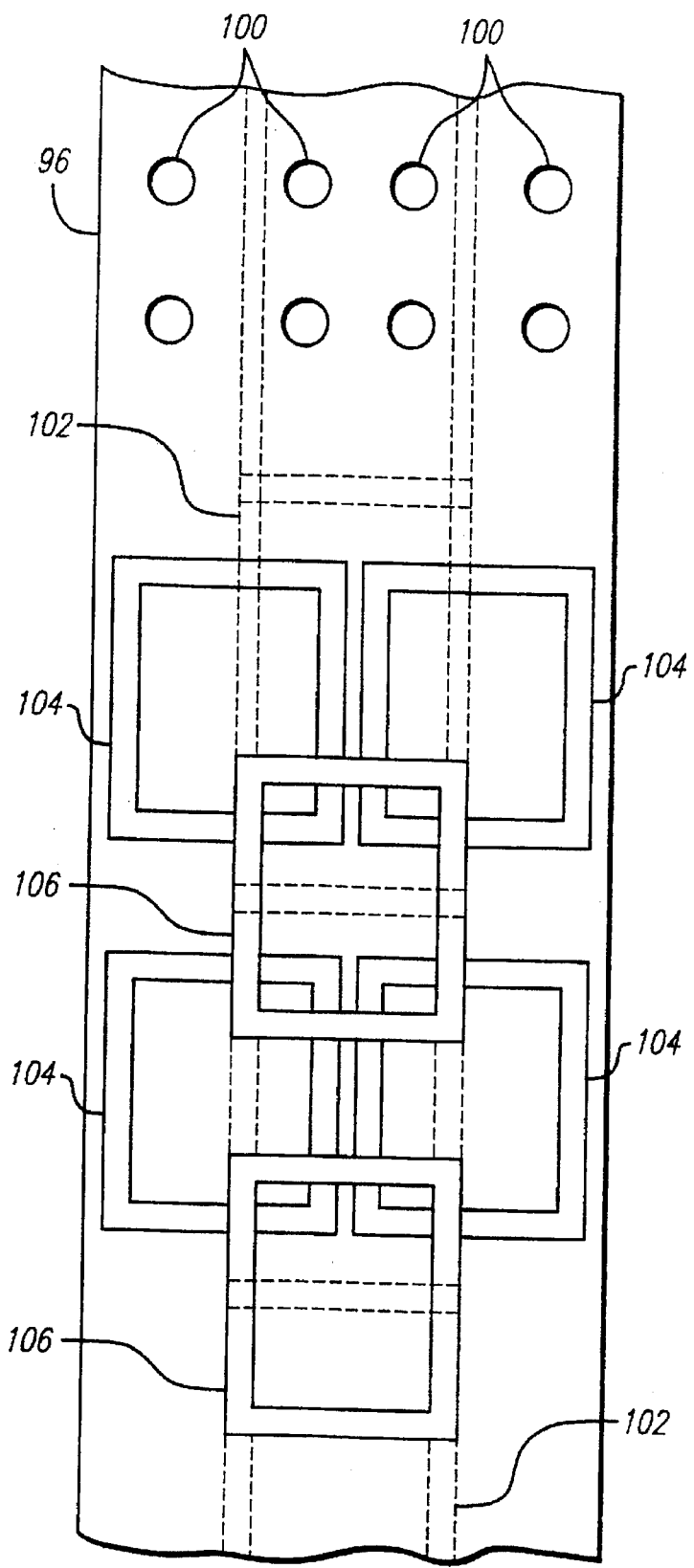
FIG. 13 is an inverted elevational view of the linear synchronous motor drive loops, vertical lift and stability loops, and lateral stability loops on a mounting plate of the guideway.
Figure 18:
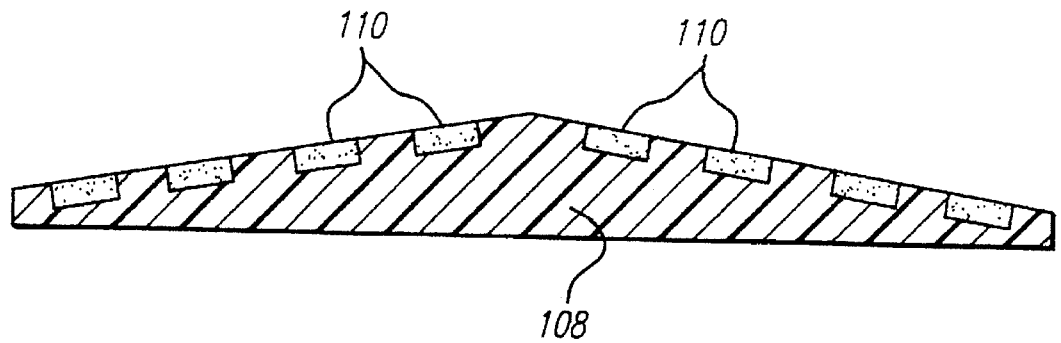
FIG. 18 is a sectional view of the breakaway energy absorption structure and sand pockets of the guideway.
Figure 19:
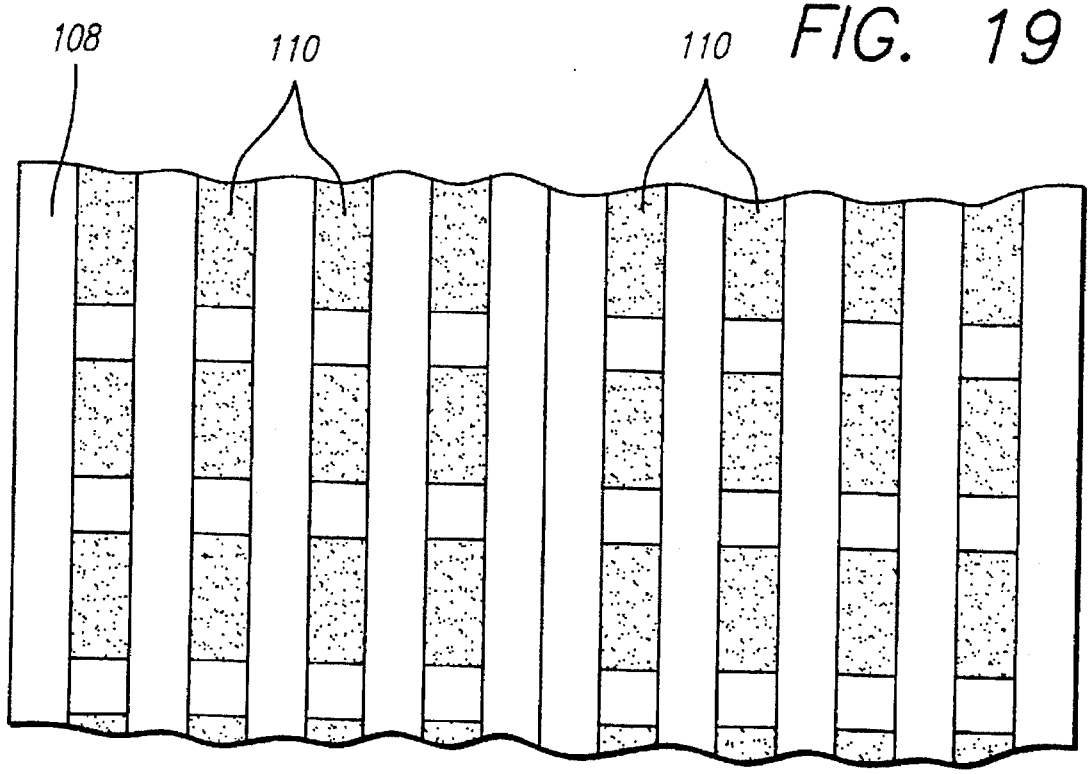
FIG. 19 is a top plan view of the sand pockets of the breakaway energy absorption structure of the guideway.

As is illustrated in the drawings, and with particular reference to FIGS. 1-5, the invention is embodied in an electromagnetic induction levitation guideway 30 for a ground vehicle 32, such as a car of a train, which can be, for example, approximately 100 feet long, weighing approximately 20 tons, and capable of carrying about a hundred passengers or freight loads up to about 100,000 pounds at speeds of up to 350 miles per hour or greater. The vehicle is typically levitated from six to eight inches over the guideway a magnetic levitation system incorporated into the vehicle and the guideway. As is illustrated in FIG. 2, the vehicle has a passenger or freight compartment 34 surrounded by a primary layer of magnetic shielding 36 that limits the magnetic field strength in the compartment to less than or equal to approximately one gauss, the strength of the normal ambient magnetic field strength. Referring to FIGS. 3-5, superconducting magnet support struts 38 are mounted underneath the vehicle to a secondary suspension or undercarriage 40 of the vehicle, providing mechanical and electromagnetic damping to minimize vibration in the passenger compartment. The undercarriage and superconducting magnet support struts are illustrated here for convenience of illustration as extending well below the body of the vehicle, although the undercarriage and struts could also be largely concealed in a lower compartment area 42. The superconducting magnet support struts can be cooled to low temperatures, such as by liquid helium or liquid nitrogen, or can be allowed to remain at roughly ambient temperature. The superconducting magnet support struts can be metallic or formed of a polymer composite material, such as a high strength fiber-reinforced materials such as polyester and glass fibers, or other similar composite materials well known in the art. Other resin systems commonly used in such fiber-reinforced materials include other thermosetting plastics such as epoxy, phenolic, and polyimide, and thermoplastics, for example. Other fibers commonly used in such fiber-reinforced material include aramid fibers and carbon fibers, for example. The superconducting magnet support struts carry a superconducting magnet cryostat (not shown), typically a cryogenic container and vacuum vessel maintained typically at 5° Kelvin or less, at which temperature current can be sustained due to superconductivity. Alternatively, higher temperature superconducting materials may also be suitable in forming the superconducting magnets. The superconducting magnet support struts thus preferably have a low thermal conductivity to provide for a low leakage of heat into the superconducting magnet cryostat. Each cryostat contains at least one superconducting magnet, and preferably contains a pair of superconducting magnets. A source of coolant, such as a reservoir of liquid helium, and a refrigeration unit (not shown), for cooling the cryostat, can be contained in the lower compartment area, for example, and for storage of effluent gas.

As is illustrated in FIGS. 3–8, the vehicle preferably carries a plurality of superconducting quadrupole magnets 48, mounted in the cryostats carried by the vehicle. The superconducting quadrupole magnets each have four identical race track coils 50 of superconducting cable 52, arranged in a square configuration, with each superconducting magnet coil being typically 16 inches wide by 36 inches long. The superconducting magnets each have a hollow core block with a central pipe, and are insulated by a layer of insulation in vacuum-tight inner and outer sealing jackets. The current maintained in each coil is typically 300 kAT (kilo ampere turns), although alternatively, the superconducting quadrupole magnets can be formed from two parallel coils (not shown), with typically double the amount of current, i.e. 600 kAT. The superconducting magnets are mounted sequentially underneath the vehicle in two rows. The magnetic polarity of the quadrupole magnets alternates sequentially, and the quadrupole magnets are spaced along each row with a predetermined pitch. The pitch is defined herein as the distance between the centers of two neighboring loops having the same polarity, i.e. the distance between the centers of two loops of the same polarity separated by one loop having a different polarity. A pair of quadrupole magnets of opposite polarity are preferably placed in each cryostat, though alternatively each quadrupole magnet can have an individual cryostat, or there can be three or more quadrupole magnets per cryostat. Additional shorted rings of high purity aluminum can also be placed in the cryostats in parallel magnetically with the superconducting coils of the quadrupole magnets to provide a long decay time if superconducting coils should go normal. Current in the coils of the quadrupole magnets is preferably induced initially by connecting the coils to an external power supply through a superconducting switch internal to the coils of the cryostat, or alternatively, current can be induced in the coils by connecting them with removable current leads to such a power supply, or by trapping a magnetic field when the magnets are supercooled.

Various other types of superconducting magnet geometries, such as dipoles, quadrupoles, sextupoles, and magnet windings of higher multipolarity, for example, can also be compatible with changes in guideway configurations. While the quadrupole magnet configuration describes achieves much lower fringing fields than dipoles, and is simple to construct, other multipole magnet geometries that generate acceptable fringe fields, are simple to construct, and allow for smooth dynamic transition between alternate guideway configurations, may also be suitable.

With reference to FIGS. 3–5 and 23, the vehicle also preferably carries ferromagnetic skids 62 that can be lowered hydraulically in an emergency, such as, for example, if the superconducting magnets should lose their superconductivity for some reason. Each skid preferably has a main body portion 64 made of a composite material, such as polyester fiberglass or the like, and a steel cap 66 at the bottom of the skid. Electrical conductor windings 68 are preferably incorporated in the steel cap for creation of a strong magnetic field that can hold the skid against the top of the guideway, as will be further explained hereinbelow, with an electromagnetic force 5 several times the weight of the vehicle. The magnetic force gradient of the emergency skids is designed to keep the vehicle centered on the beam when it is in use. The vehicle can carry multiple emergency skids, for redundancy, each with independent activation and extension systems.

As is shown in FIGS. 1 and 2, the electromagnetic induction ground vehicle levitation guideway 30 is mounted on piers 70 terminating at their top end in pier caps 72 that can be adjusted in height to match elevation of adjacent piers. The piers are preferably set on a concrete foundation 74 formed in the field, although the piers can also be mounted on other suitable types of bases. The guideway includes a plurality of beam support members, or beams 76, that are each typically 50 to 100 feet in length, supporting the weight of vehicle. The beam support members are preferably made of conventional steel, but can also be made of reinforced concrete, polymer concrete or a composite material such as polyester fiberglass, and the like. Electrical connections from one beam support member to another can be made at the interface between the pier and the guideway. The beam support members rest upon the pier caps of the piers, and are free to expand and contract longitudinally with temperature changes.

Figures 20, 21, 22:
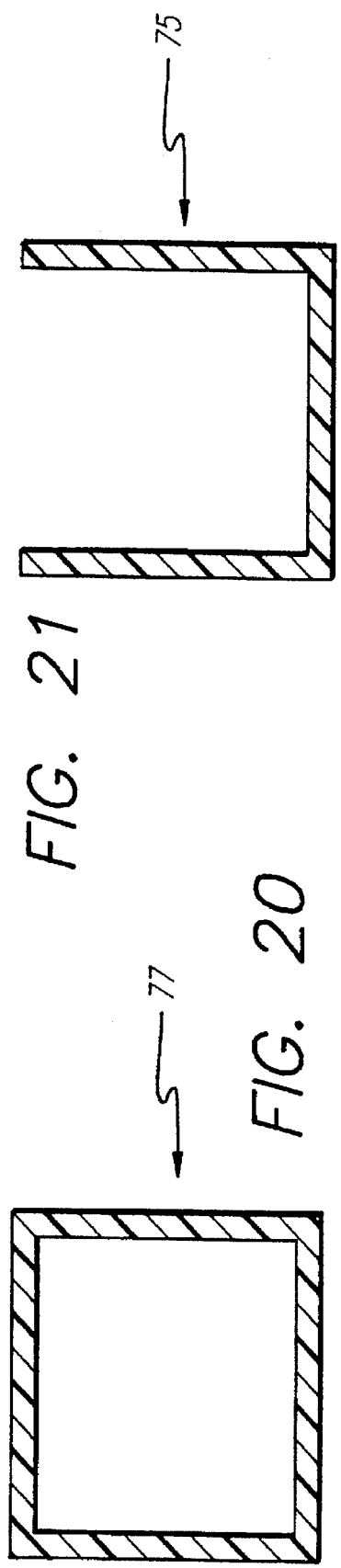
FIG. 20 is a sectional view of an alternate box shaped beam support member of the guideway.
FIG. 21 is a sectional view of an alternate channel shaped beam support member of the guideway.
FIG. 22 is a side elevational view of the guideway illustrating grounding of the guideway for protection against lightning strikes.

As is illustrated in FIGS. 3–5, the beam support members are preferably formed in an I-beam shape, but alternatively can be formed to have a double I-beam shape (not shown), a channel shape 75, or a box-beam shape 77, for example, as shown in FIGS. 20 and 21. The shape of the beam support member is generally dependent on mechanical requirements and parameters, such as the desired deflection, stress, and stiffness of the guideway, and cost.

The guideway also includes a transverse structural slab 78 that provides transverse stiffness and against side wind loads on the vehicle and the guideway, as is illustrated in FIGS. 3–5 and 23. The structural slab is preferably formed of a non-metallic material such as polymer concrete, to provide high strength and structural rigidity, and a long service life. The structural slab may be reinforced with pretensioned steel wires transverse to guideway beam length, or other reinforcing materials, such as re-bars, fiberglass rods, and the like. The structural slab is preferably bolted to the main structural beam, and may be segmented along the beam to compensate for differential expansion and contraction due to temperature changes, if the slab and main beam have different coefficients of thermal expansion. The structural slab may also be hollow or have an egg crate type construction with an arrangement of structured voids, or a honeycomb structure, or the like, to enhance stiffness and minimize the amount of material required.

Figure 23:
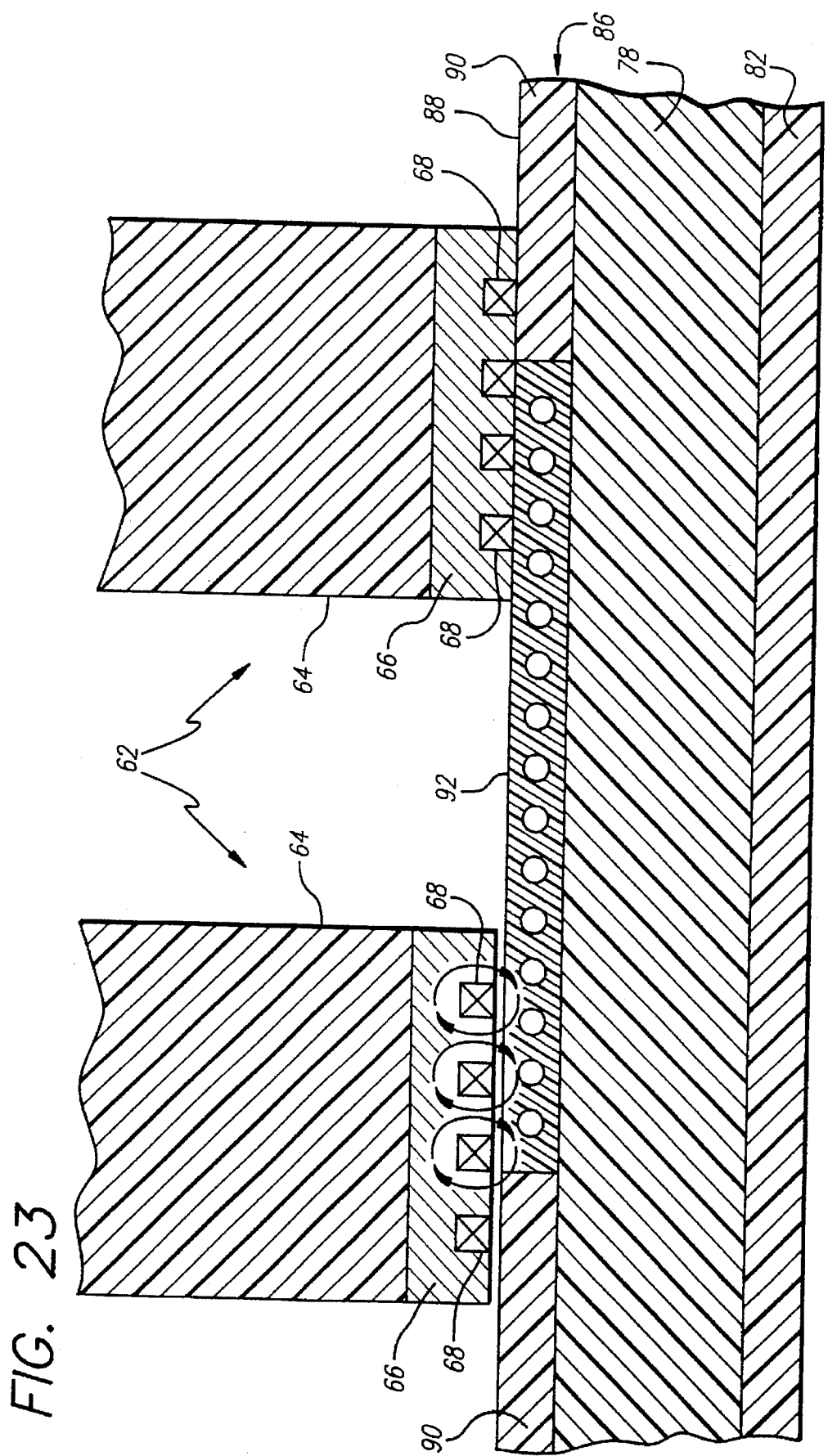
FIG. 23 is an enlarged, partial sectional view of ferromagnetic skids of the ground vehicle resting upon the top structural plate of the structural slab.

The structural slab preferably has a plurality of lower studs (not shown) for attachment of a strong, rigid bottom structural plate 82, preferably formed of a reinforced composite material, such as polyester fiberglass or the like, and having holes (not shown) for receiving the studs, to allow the bottom plate to be bolted and/or adhesively bonded to the slab to form an integrated structure with structural slab. The structural slab also has a strong, rigid top structural plate 86, also preferably formed of a similar reinforced composite material and adhesively bonded and/or bolted to the structural slab to form an integrated structure with structural slab, having a flat upper surface 88 for receiving the emergency braking skids, as shown in Fig. 23. The top and bottom structural plates can also be formed of a plastic laminate or polymer concrete, for example. Both the top and bottom structural plates can additionally contain a distribution of small diameter steel wires arranged to minimize eddy current losses. The small diameter wires are insulated from each other so that eddy current losses caused by changing magnetic fields are small. The small diameter wires primarily extend in a direction transverse to length of the beam, although some wires can also be distributed extending along the length of the beam to provide cohesion for the top and bottom structural plates.

Referring to FIGS. 3–5 and 23, the top structural plate also includes a non-ferromagnetic portion 90 at the sides of the top structural plate, and a ferromagnetic portion 92 in the center of the plate, typically containing a high density of a plurality of ferromagnetic steel wires, to which the emergency skids will be strongly magnetically attracted, so that the emergency skids will remain centered on the guideway when they are used. The side portions of the bottom structural plate can also include auxiliary ferromagnetic lift elements 94, to provide lift by magnetic attractive interaction with the superconducting magnets of the vehicle; and to also provide additional magnetic shielding for the passenger compartment. The ferromagnetic lift elements can consist of ferromagnetic plates, multiple sheets, stranded wire, or a powder mechanically anchored and/or adhesively bonded on or within the bottom structural plate.

With reference to FIGS. 3–5 and 13, mounting plates 96 are provided on either side of beam support member, equidistant from the longitudinal center line of the beam support member, underneath the bottom structural plate, with the ferromagnetic lift elements extending beyond the mounting plates. The mounting plates can be secured to the beam support member by a network of horizontal and vertical support braces (shown in FIG. 4), which can in turn be secured to the beam support member and the mounting plates, such as by welding, or adhesive bonding, and the like. The mounting plates are preferably formed of a rigid, high strength composite material such as polyester fiberglass or the like. Metallic fibers such as aluminum may be incorporated in the mounting plates to improve their thermal conductivity. A plurality of holes 100 may also be provided in the mounting plates to allow for convective cooling of the guideway.

Now referring to FIGS. 6–13, a plurality of linear synchronous motor (LSM) drive loops or propulsion windings 102 are attached to the mounting plates on each side of the guideway equidistant from the longitudinal centerline of the beam support member, such as by straps and/or adhesive bonding. The LSM drive loops are preferably formed of insulated stranded aluminum wire, to minimize the generation of eddy currents. Although the LSM drive loops are shown mounted to the outside of the mounting plates, they can also be mounted on the inside of the mounting plates. The propulsion windings are actively powered by AC current to interact with the superconducting magnets of the vehicle to provide thrust to the vehicle. A plurality of the propulsion windings are provided, alternating sequentially in polarity along the guideway, achieved by cross-overs in the winding pattern of the propulsion windings, so that current flows so as to create a magnetic field in a first direction for a first LSM drive loop, and in a second direction opposite to the first direction for a second LSM drive loop adjacent to the first LSM drive loop. The LSM drive loops are arranged sequentially with a pitch that is the same as the pitch of the superconducting magnets of the vehicle, so that the superconducting magnets and LSM drive loops alternately repel and attract each other as the polarity of the alternating current through the LSM drive loops changes. The speed of the vehicle can thus be controlled by controlling the AC frequency of the current supplied to the LSM drive loops. The AC current is typically provided to the LSM drive loops in blocks of one to two kilometers in length along the guideway, for example. For simplicity, the LSM drive loops in FIGS. 6–13 are shown as single phase windings attached to the mounting plates. However, multi-phase LSM winding loops may also be used to propel the vehicle.

As is illustrated in FIGS. 3, 5, 7, and 11–13, a plurality of vertical lift and stability loops 104 are also mounted to the mounting plates by adhesive and/or straps, on each side of guideway equidistant from the longitudinal center line of the beam support member, capable of supporting the vehicle above the guideway, typically a distance of from 6 to 8 inches. The vertical lift and stability loops are preferably formed of insulated stranded aluminum wire to minimize the generation of eddy currents. The vertical lift and stability loops are preferably configured in a planar null-flux geometry, such as the vertically oriented figure 8 loops shown in the drawings. However, other planar null-flux geometries can also be used. When a superconducting magnet is vertically centered on a figure 8 loop, the induction into the upper half of the figure 8 loop is equal and opposite to the induction into the lower half of the 8 loop, so that no current flows through the loop, and no restoring force results. However, if the superconducting magnets are not centered vertically on the figure 8 loops on each side, a vertical restoring force proportional to the displacement of the center of the superconducting magnets from the center of the vertical lift and stability loops forces the superconducting magnets back to the vertical center of the figure 8 loops. The vertical lift and stability loops thus impart pitch stability, as is illustrated in FIG. 3, and roll stability, as is illustrated in FIG. 5. The vertical lift and stability loops can be spaced apart from each other or tightly packed sequentially along the guideway. Although the vertical lift and stability loops are shown as extending above and below the superconducting magnets of the vehicle, the vertical lift and stability loops can also be as tall or shorter than the superconducting magnets. A vertical force equivalent to several times the weight of the vehicle is required for the vehicle to contact the guideway. The magnetic lift to drag ratio of the vertical levitation system can be further increased by the magnetic interaction of the superconducting magnets with the ferromagnetic lift elements in the bottom structural plate.

With reference to FIGS. 4, 7, 9, and 10–13, a plurality of lateral stability loops 106 are also mounted to the mounting plates on each side of the guideway equidistant from the longitudinal centerline of the beam support member, such as by adhesive and/or straps, to interact magnetically with the vehicle superconducting magnets. The lateral stability loops are preferably formed of insulated stranded aluminum wire, to minimize the generation of eddy currents. Lateral stability loops on either side of the guideway are cross-connected by connectors 107 in pairs, so that a first lateral stability loop on one side of the guideway is cross-connected to a second loop on the other side of the guideway immediately opposite to the first loop, in a null flux arrangement. Thus, when opposing pairs of superconducting magnets of the vehicle are centered laterally on the guideway, the induction in the lateral stability loops from the two sides of the guideway is equal. However, when the opposing pairs of the superconducting magnets vehicle are not centered laterally on the guideway, strong restoring forces automatically force the vehicle to the longitudinal center of the guideway. The lateral stability loops thus also impart yaw stability, as is shown in FIG. 4, illustrating the case where the vehicle has been locally displaced to the right with respect to the guideway. The direction of the forces on the vehicle magnets are shown as operating to restore the vehicle to its centered position. A lateral force equivalent to several times the weight of the vehicle is required for the vehicle to contact the guideway. The size of the lateral stability loops can be less than, equal to, or greater than the length of the other loops. While the polarity of the LSM drive loops changes half way along the lateral stability loops in the direction of travel, as is shown in the drawings, the functions of the LSM drive loops, the vertical lift loops, and the lateral stability loops are preferably entirely separated. The loops are preferably centered on one another in a vertical dimension, so that the lateral stability loops are vertically centered on the figure 8 lift loops and the LSM loops for example, so that no current is induced in one loop by another loop.

The lateral stability loops can alternatively be formed in other geometries that can also achieve the desired lateral null flux condition, without cross coupling. For example, the lateral stability loops can be formed as pairs of first and second loops connected in series on each side of the guideway, mounted equidistant from the longitudinal center line of the beam support member, with the first loop in a pair being farther from the beam support member than the second loop on the same side, so as to give no net induction when the vehicle is laterally centered on the guideway.

As is shown in FIGS. 3–5, 14, and 17–19, a breakaway energy absorption structure 108, preferably made of composite material with an egg crate type internal structure, is also disposed on top of the top structural plate, for absorbing the kinetic energy of the vehicle in the event of an emergency loss of vertical lift of the vehicle. The composite material of the breakaway energy absorption structure is preferably formed from a polymer matrix such as polyester fiberglass, with fibrous reinforcing, such as metallic or non-metallic fibers. The breakaway energy absorption structure may alternatively be made of a closed cell foam polymer matrix, for ease of construction, which can also include fibrous reinforcing material. Steel fibers, or small diameter wires, for example, can be utilized in the composite material to provide additional shielding. The breakaway energy absorption structure also preferably contains a plurality of pockets 110 filled with loose particulate filling material, or inert small diameter particles, such as sand, that can be accelerated by the vehicle as it breaks away the energy absorption structure, absorbing kinetic energy to help slow the vehicle, with minimum damage to the vehicle. The amount of sand loading is typically about 25 kg/meter along the guideway. The breakaway energy absorption structure can be attached to the upper surface of the top structural plate by adhesive, for example. The particulate matter can be contained in other similar suitable structures that will be rapidly slow down the vehicle by transferring its kinetic energy to the particulate matter, under emergency conditions where aerodynamical, frictional, or regenerative electromagnetic braking systems are not adequate, or fail to function. The transfer of kinetic energy ideally will occur spontaneously with loss of lift by simple mechanical interference of the vehicle with the breakaway energy absorption structure. A "cowcatcher" on the front of the vehicle can optionally be provided, to be lowered to shred the breakaway energy absorption structure in the event of loss of lift.

The breakaway energy absorption structure is preferably covered by a top protective cover 112 that is preferably shaped to minimize adhesion and buildup of snow and ice, and preferably provides a sloped roof to the guideway. The top protective cover is typically formed from a thin, flexible composite layer of material with a low friction surface, to keep water out of the energy absorption structure, and to protect the energy absorption structure against degradation by sunlight. The top protective cover can for example be made of flexible, flame resistant plastic. The top protective cover is preferably flexible so as to move when a vehicle passes overhead, to help break up and dislodge snow and ice buildup, and to dislodge other loose objects that may be resting on top of the guideway. The top cover is preferably mounted over the energy absorption structure with an air gap 113 between them, to allow for convective cooling. The air gap can for example be provided by mounting top protective cover to the top surface of the energy absorption structure with a plurality of short studs or protrusions (not shown), so that the top protective cover is spaced apart from the energy absorption structure a fixed distance. The top protective cover also preferably contains a network of fine heating wires 114 to melt snow and ice that may accumulate on the guideway, and is preferably grounded through the beam support members to the piers, for protection of the guideway from lightning, as is illustrated in FIG. 22.

A side protective cover 116 is also preferably mounted on each side of the guideway to the outside of the mounting plates by studs (not shown), holding the side protective cover at a fixed distance from the mounting plates to provide an air gap for convective cooling of the guideway. Weep holes (not shown) can also be provided in the bottom of the side protective cover at the base of the beam support member, to allow water that condenses from water vapor in the air to escape.

Now referring to FIGS. 3–5, and 14–17, the guideway also preferably includes a sensor system for sensing objects resting on or against the guideway, for determining the location and speed of the vehicle, and for measuring the currents and magnetic fields along the guideway. The sensor system preferably includes weight sensitive sensors 118 embedded in the upper surface of the energy absorption structure under the top protective cover across the width of the structural slab of the guideway, and weight sensitive sensors 120 embedded in the side protective cover, for detecting the presence of a heavy object 121 on the top or resting on the side of the guideway that could damage the vehicle. The sensor should be made sensitive to heavier objects, so that birds and light objects will not trigger the weight sensitive sensors. The weight sensitive sensors can, for example, be continuity circuit sensors, made of fine, high resistance wires 122 electrically isolated until the weight of an object pushes them onto an adjacent ground strip 124, to complete the circuit. The weight sensitive sensor circuits can be connected to an alarm to be activated once a heavy object is detected. The location of the object can be determined by control circuitry 128 connected to the weight sensitive sensors from measurement of the resistance of the closed circuit. In this manner, the control circuitry can be used to monitor the location of the vehicle and the speed of the vehicle from the input from the weight sensitive sensors. Alternatively, as shown in the drawings, the weight sensitive sensors can be optical fibers 130 embedded in the top or side protective covers, to detect flexing of the covers as the vehicle passes by, or as a heavy object presses on the covers, since the index of refraction of the optical fiber will change with the weight of the object. Magnetic pickup loops can also be provided in the side protective covers for measuring the currents in the loops, and the magnetic fields along the guideway, which can also be used for determining the location and speed of the vehicle along the guideway.

As can be seen from FIGS. 3–5, the interior of the support beam, as illustrated, contains much void space. It is understood that this void space can contain molded trays and conduits for electrical cables, and other sensors.

It has thus been demonstrated that the invention comprises an electromagnetic induction guideway providing lift, and inherent vertical and lateral stability, including pitch, yaw and roll stability, for vehicles using superconducting magnets for levitation, and a kinetic energy absorption system for high speed mechanical braking of the vehicle in the event of failure of the superconducting magnets. The guideway readily sheds precipitation and debris, and includes sensors for detecting hazardous objects on or near the guideway, as well as the location and speed of the vehicle on the guideway. The guideway requires a minimum of ground area, and can be formed of lightweight pre-fabricated structures that can be mass produced in a factory, with all structural and electrical elements attached, and transported to the field for connection of the LSM propulsion windings at the beam ends and minimal assembly to produce the finished ready-to-operate system. The outside surface of the guideway is smoothly contoured without bumps, projections, holes, or the like, that could increase aerodynamic drag or noise caused by movement of air as it is displaced by the on-coming high speed vehicle. The narrow beam guideway allows the vehicle to be levitated using a versatile, low fringe field, superconducting quadrupole magnet design that also allows the vehicle to be switched with high speed switching and levitated with sections of a flat planar guideway to which the narrow beam guideway can be connected.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. A guideway for a vehicle having magnets for providing magnetic levitation of the vehicle, the vehicle being adapted to travel in a longitudinal direction along said guideway, said guideway comprising:

a beam support member for supporting the weight of said vehicle;

a transverse structural slab member formed of non-metallic material mounted on top of said beam support member, said structural slab member having a top surface and a bottom surface; and breakaway energy absorption means mounted above said transverse structural slab member for absorbing kinetic energy from said magnetic levitation vehicle in the event of loss of magnetic levitation.

2. The guideway of claim 1, wherein said energy absorption means further includes a plurality of pockets filled with particulate matter that can be accelerated by the vehicle as it breaks away the energy absorption structure, absorbing kinetic energy of the vehicle.

3. The guideway of claim 1, wherein said energy absorption means comprises a composite polymer matrix.

4. The guideway of claim 3, wherein said composite polymeric matrix includes reinforcing fibers.

5. The guideway of claim 3, wherein said composite polymeric matrix includes steel reinforcing fibers to provide magnetic shielding.

6. The guideway of claim 1, wherein said energy absorption means comprises a closed cell foam polymer matrix.

7. The guideway of claim 6, wherein said closed cell foam polymer matrix includes reinforcing fibers.

8. The guideway of claim 1, wherein said transverse structural slab member is formed from polymer concrete.

9. The guideway of claim 8, wherein said transverse structural slab member is reinforced transverse to the longitudinal direction of the guideway.

10. The guideway of claim 1, wherein said transverse structural slab member is formed from fiber reinforced concrete, and is reinforced transverse to the longitudinal direction of the guideway.

11. The guideway of claim 1, wherein said transverse structural slab member is hollow.

12. The guideway of claim 1, further comprising a thin, flexible, top protective cover shaped to minimize adhesion and buildup of snow and ice on the top of said guideway.

13. The guideway of claim 12, wherein said top protective cover is grounded for protection of said guideway from lightning.

14. The guideway of claim 1, further including sensor means mounted to said guideway for detecting the location of said vehicle and the presence of heavy objects contacting said guideway.

15. A guideway for a magnetic levitation vehicle adapted to travel in a longitudinal direction along said guideway, comprising:

a beam support member having side edges and a length extending longitudinally along said guideway;

a transverse structural slab member formed of non-metallic material mounted on top of said beam support member, said structural slab member having a flat, generally horizontal top surface, and said structural slab member extending beyond the side edges of said beam support member; and a top structural plate mounted to said top surface of said structural slab member, said top structural plate having a flat upper surface, said top structural plate having a ferromagnetic portion disposed in a central portion of said top structural plate, and peripheral portions consisting essentially of non-ferromagnetic material.

16. The guideway of claim 15, further comprising breakaway energy absorption means mounted above said transverse structural slab member and said top structural plate for absorbing kinetic from said vehicle in the event of loss of magnetic levitation.

17. The guideway of claim 16, wherein said energy absorption means further includes a plurality of pockets filled with particulate matter that can be accelerated by the vehicle as it breaks away the energy absorption structure, absorbing kinetic energy of the vehicle.

18. The guideway of claim 16, wherein said energy absorption means comprises a composite polymer matrix.

19. The guideway of claim 18, wherein said composite polymeric matrix includes reinforcing fibers.

20. The guideway of claim 18, wherein said composite polymeric matrix includes steel reinforcing fibers to provide magnetic shielding.

21. The guideway of claim 16, wherein said energy absorption means comprises a closed cell foam polymer matrix.

22. The guideway of claim 21, wherein said closed cell foam polymer matrix includes reinforcing fibers.

* * * * *